United States Patent
Kallay et al.

(10) Patent No.: US 8,669,983 B2
(45) Date of Patent: Mar. 11, 2014

(54) BUFFER CONSTRUCTION WITH GEODETIC CIRCULAR ARCS

(75) Inventors: Michael Kallay, Bellevue, WA (US); Danica M. Porobic, Novi Sad (SB)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 12/872,650

(22) Filed: Aug. 31, 2010

(65) Prior Publication Data

US 2012/0050294 A1 Mar. 1, 2012

(51) Int. Cl.
  *G06T 11/20* (2006.01)
  *G09G 5/00* (2006.01)
  *G06T 19/00* (2011.01)
  *G06T 11/00* (2006.01)
  *G09G 5/14* (2006.01)

(52) U.S. Cl.
  CPC ............ *G06T 11/206* (2013.01); *G06T 11/203* (2013.01); *G06T 19/00* (2013.01); *G06T 11/00* (2013.01); *G09G 5/14* (2013.01)
  USPC ..................... 345/440; 345/440.1; 345/440.2; 345/441; 345/442; 345/443; 345/629; 345/689; 345/698

(58) Field of Classification Search
  CPC ..... G06T 11/206; G06T 11/203; G06T 11/00; G06T 19/00; G09G 5/14
  USPC .......... 345/418–427, 440–443, 629, 689, 698
  See application file for complete search history.

(56) References Cited

U.S. PATENT DOCUMENTS

| | | | |
|---|---|---|---|
| 6,700,576 B1 * | 3/2004 | Lazenby et al. | 345/441 |
| 7,227,545 B2 * | 6/2007 | Maillot et al. | 345/423 |
| 2002/0005856 A1 * | 1/2002 | Sasaki | 345/606 |
| 2003/0218609 A1 * | 11/2003 | Maillot et al. | 345/423 |
| 2004/0015434 A1 | 1/2004 | McCue | |
| 2004/0172264 A1 * | 9/2004 | Fletcher et al. | 705/1 |
| 2004/0203699 A1 * | 10/2004 | Oesterling et al. | 455/421 |
| 2005/0093858 A1 * | 5/2005 | Tsai et al. | 345/419 |
| 2007/0024624 A1 * | 2/2007 | Poppen | 345/441 |
| 2008/0074423 A1 | 3/2008 | Gan | |
| 2009/0027398 A1 * | 1/2009 | Frisken | 345/442 |

(Continued)

OTHER PUBLICATIONS

Kallay—"Defining Circular Arcs on a Round Earth"—Published 2010 http://delivery.acm.org/10.1145/1830000/1823905/a45-kallay.pdf?key1=1823905&key2=2194020821&coll=&dl=&CFID=15151515&CFTOKEN=6184618—pp. 1-2.

(Continued)

*Primary Examiner* — Jin-Cheng Wang
(74) *Attorney, Agent, or Firm* — Nicholas Chen; David Andrews; Micky Minhas

(57) ABSTRACT

A method with acts for representing a buffer about a feature represented on an ellipsoid or round-object model. The method includes accessing a definition of a buffer stored on one or more computer readable medium in a format readable by a computer application. The definition of the buffer includes a number of arcs around a feature on an ellipsoid or round-object model. Each of the arcs is defined using three points defined using geodetic coordinates. The three points includes two endpoints of a given arc and a point on the arc between the two endpoints. The method further includes rendering the buffer by rendering the plurality of arcs. The method further includes displaying the rendered buffer to a user at a computing system display.

16 Claims, 4 Drawing Sheets

(56) References Cited

U.S. PATENT DOCUMENTS

| | | | |
|---|---|---|---|
| 2009/0040229 A1* | 2/2009 | Stitt et al. | 345/441 |
| 2009/0225078 A1* | 9/2009 | Rossignac et al. | 345/423 |
| 2009/0303235 A1* | 12/2009 | Maekawa et al. | 345/423 |
| 2010/0109952 A1 | 5/2010 | Wigren | |
| 2011/0078223 A1* | 3/2011 | Maekawa et al. | 708/270 |

OTHER PUBLICATIONS

Author Unknown—"Geometry"—Retrieved Jul. 26, 2010 http://resources.esri.com/help/9.3/arcgisengine/dotnet/12105296-1a78-4cba-b306-c0a47d02a64b.htm—pp. 1-10.

Author Unknown—"Spatial Concepts"—Retrieved Jul. 26, 2010 http://download.oracle.com/docs/html/A88805_01/sdo_intr.htm—pp. 1-20.

Emery—"SQL Server The Geography Data Type"—Published Apr. 22, 2009 http://blog.geoffreyemery.com/post/SQL-Server-The-Geography-Data-type.aspx—pp. 1-4.

Author Unknown—"Class Geometry"—Retrieved Jul. 26, 2010 http://www.vividsolutions.com/jts/javadoc/com/vividsolutions/jts/geom/Geometry.html—pp. 1-27.

Author Unknown—"Geometry Library Overview"—Retrieved Jul. 26, 2010 http://edndoc.esri.com/arcobjects/9.2/java/java/library_reference/Geometry/Geometry_overview.htm—pp. 1-15.

McGovern—"Geographic Distance and Azimuth Calculations"—Published Mar. 26, 2003 http://www.codeguru.com/Cpp/Cpp/algorithms/print.php/c5115/—pp. 1-17.

Wikipedia, 2010, World Geodetic System, http://en.wikipedia.org/wiki/World_Geodetic_System.

Kallay, M., 2007, "Defining Edges on a Round Earth," Proceedings of ACMGIS 2007, 63.

Kallay, M., 2008, "Geometric Algorithms on an Ellipsoid Earth Model," Proceedings of ACMGIS 2008, 42.

* cited by examiner

BUFFER CONSTRUCTION WITH GEODETIC CIRCULAR ARCS

BACKGROUND

Background and Relevant Art

Computers and computing systems have affected nearly every aspect of modern living. Computers are generally involved in work, recreation, healthcare, transportation, entertainment, household management, etc.

Computing systems can be used to model geometric objects. For example, computer system can model planar geometric objects such as lines, circles, polygons, etc.

The buffer of distance d around a geometric object o is the set of all point that are within distance d from o. Namely, the buffer about a geospatial object is the set of all points whose distance from the geospatial object does not exceed some prescribed threshold. Buffer is one of the most fundamental constructions in geospatial computations. For example, it may be used to define the danger zone around the path of a hurricane, or as a query window for selecting all the objects in a database which are in the vicinity of a given object.

Even when o is as simple as a point or a line, an exact representation of the theoretical buffer around it uses circular arcs. For example, around a point, the buffer with a distance d is a circle with a radius d. The buffer with a distance d around a line appears rectangular along the length of the line, but has a half circle with a radius d at each end of the otherwise rectangular shape. FIG. 1 illustrates a number of examples of buffers, including a buffer 102 around a point 104, a buffer 106 around a line 108, and a buffer 110 around an arc 112. In the absence of circular arcs, the buffer is approximated by polygons, and higher accuracy requires a corresponding larger number of vertices. The object models of existing products include circular arcs only in planar geometry. No existing product supports circular arcs on an ellipsoid earth model.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A method with acts for representing a buffer about a feature represented on an ellipsoid or round-object model may be performed. The method includes accessing a definition of a buffer stored on one or more computer readable medium in a format readable by a computer application. The definition of the buffer comprises a plurality of arcs around a feature on an ellipsoid or round-object model. Each of the arcs is defined using three data points, at least one of which is defined using geodetic coordinates, such as latitude and longitude. The three points comprise two endpoints of a given arc defined using geodetic coordinates and a third point that defines curvature of the arc between the two endpoints. The method further includes rendering the buffer by rendering the plurality of arcs. The method further includes displaying the rendered buffer to a user at a computing system display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
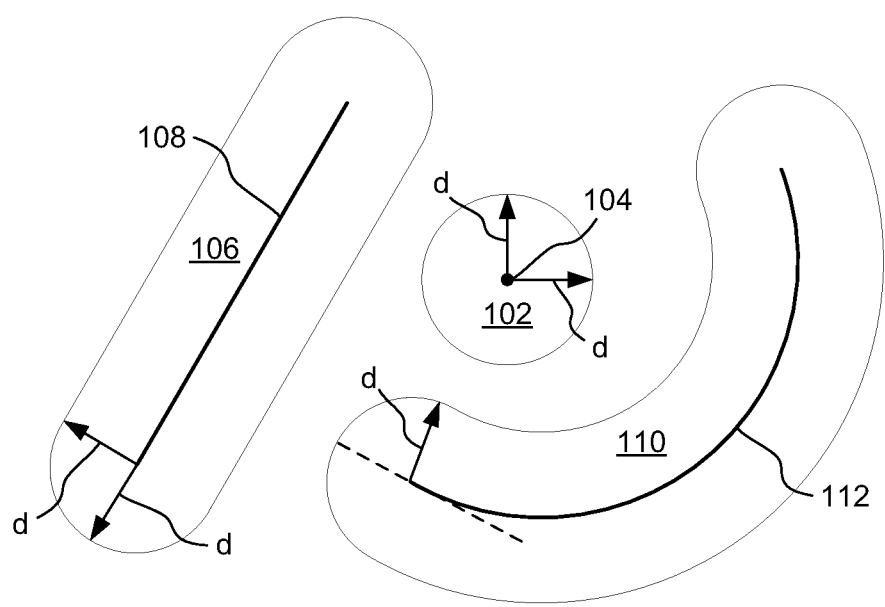
FIG. 1 illustrates buffers around planar geometric objects.

Embodiments may include functionality for defining and using the definition of a circular arc on an ellipsoid earth model. These definitions may be used in various computer applications including storage applications and/or rendering applications.

For example, embodiments may be implemented in database applications. In particular, a database system may include a data type specific to circular arcs on ellipsoid or round-object models such that point values defined in objects of the data type are by definition geodetic coordinates. For example, one embodiment may be embodied in SQL Server® use circular arcs in the existing round-earth SqlGeography type. A new SqlGeography.BufferWithCurves method can be used to construct buffers represented with circular arcs. Such a representation is more accurate and much more compact than a polygonal approximation.

The great-circle distance is the shortest distance between any two points on the surface of a sphere measured along a path on the surface of the sphere. Thus, while the distance between two points in Euclidean space is the length of a straight line from a first point to the second point, on a sphere the distance is the great circle distance. In spherical or ellipsoid geometries, straight lines are replaced with geodesics.

Geodesics on a sphere are the great circles (circles on the sphere whose centers are coincident with the center of the sphere).

For any two different points on a sphere which are not directly opposite each other, there is a single unique great circle. The two points separate the great circle into two arcs. The length of the shorter arc is the great-circle distance, and thus the shortest distance over the surface of the sphere, between the points.

Between two points which are directly opposite (i.e. antipodal points) each other there are an infinite number of great circles that pass through these two points. All great circle arcs between these two directly opposite points have the same length, which is one half of the circumference of the great circle.

Embodiments may be implemented where an arc (great circle arcs or otherwise) can be defined on a sphere using three data points. However, one or more of the three data points may be defined using geodetic coordinates, such as latitude and longitude. This can be accomplished in some embodiments because the 3D circle that contains 3 points on a sphere lies entirely on the sphere. For example, two data points may define geodetically coordinates of the endpoints of the arc. The third point defines the curvature of the arc. This may be done, for example, by defining a third point geodetically on the arc. Alternatively, curvature may be defined by using a data point that defines a bulge. A bulge number defines the curvature of an arc. For example, the bulge may be zero for a straight line and larger for larger curvatures. The sign of the bulge number indicates to which side of a line defined by the endpoints the arc curves.

The earth is not (and other objects are not) exactly spherical, and it may be conventionally modeled by an ellipsoid. Embodiments may use the definition of circular arcs on the unit sphere over to the ellipsoid by using mapping that associates every point on the ellipsoid with the unit vector that is normal to the surface of the ellipsoid. The resulting arc on the ellipsoid is not exactly circular, but it very well approximates a curve on the ellipsoid that lies at a constant distance from a point or a line. For example, the exact buffer around a point can be I approximated with 4 arcs with an error that does not exceed 0.001% of its radius.

On a sphere, any pair of distinct non-antipodal points defines a unique great-circle arc, which for the purpose of defining spherical polygons and line-strings is the "line segment" between them. In one embodiment that embodies an SQL Server® (available from Microsoft Corporation of Redmond Wash.) SqlGeography class, the definition of line segments on an ellipsoid earth model relies on the reference sphere—a unit sphere on which every point represents the point on the ellipsoid with the same geodetic (longitude-latitude) coordinates. The "line segment" between a pair of (non-antipodal) points on the ellipsoid is defined as the great-circle arc between them on the ellipsoid's reference sphere.

The circular arc defined by 3 geodetically defined points on the ellipsoid is the circular arc through their representatives on the reference sphere. Inasmuch as the mapping from the reference sphere to the ellipsoid introduces a slight distortion, such an arc may not be exactly circular on the ellipsoid, because it may not be equidistant from any center point. However, arcs that are circular on the ellipsoid can be approximated very efficiently with these reference sphere arcs. For example, On the WGS 84 ellipsoid, any circle can be approximated by 4 arcs with an error that does not exceed 0.06% of its radius.

A construction of buffer on a sphere is now discussed. Distances between points are measured as arc length on the sphere. For the purpose of computing offset vectors, the direction of a segment at a point p is the segment's tangent vector at p. The offset directions are perpendicular to that in the sphere's tangent plane at p. The computation of union is performed in some planar projection. Illustrating an example with reference to FIG. 2, the offset of a line segment 202 is in general not a line segment, so in the absence of arcs, edge offsets 204 and 206 are approximated polygonally. In particular, while the "lines" shown in FIG. 2 appear to be arcs, they are in fact great circle arcs, which equate to lines in a spherical modeling space. Thus, in the example shown in FIG. 2, each offset is approximated by two lines (i.e. great circle arcs) and each end cap is approximated by four lines (i.e. great circle arcs).

In the plane, the addition of circular arcs to a points-and-lines object model affords exact representation of end caps and corner rounding. But on a sphere, it also affords an exact representation for the offsets of line segments. And because the offsets of circular arcs are also circular arcs (albeit with different radius), defined using endpoints and one additional point on the circle arc, an object model based on points, line segments and circular arcs is closed under the buffer operation.

Implementation is somewhat more complicated on ellipsoid earth models. The following illustrates actions that may be taken for ellipsoid earth models. Some embodiments measure the distance between points as the length of the line segment between them, such as geodesic distance, defined as the length of the shortest path (i.e. geodesic curve) between the points. Embodiments may use other definitions of distances. For example, in one embodiment, the geographic (longitude and latitude) coordinates of a point on the globe are defined by the direction of a vector that is normal to the surface of the globe at that point. For purposes of the following definition, the space of nonzero normal vectors is the space of directions. The unit sphere there is the sphere of directions. The mapping from a point on a surface to the unit normal vector there is known as the Gauss mapping. Its inverse of that mapping (denoted IGM here) assigns a point on the globe to any vector on the sphere of directions. A definition for a length of line may be an edge which is the image under the IGM of the short great circle arc on the sphere of directions between the unit normal vectors at its endpoints. The IGM extends to the space of directions, and the inverse image of a great circle arc coincides with that of its chord, hence, thus alternatively, an edge is the image under the IGM of a line segment in the space of directions. The definition is obviously not valid if the endpoints are antipodal or the line segment contains the origin. This is not exactly geodesic distance, but is sufficient for many embodiments.

Embodiments may compute direction vectors in the tangent plane of the reference sphere, and offset directions are computed to be perpendicular to them in that plane. On the ellipsoid they are perpendicular only approximately, but the error introduced to the buffer computation by this compromise may be negligible in many embodiments. Embodiments may define circular arcs that are not exactly circular, and the offsets of line segments and circular arcs (under any definition) cannot be represented exactly as circular arcs (of any type). However, offset curves can be approximated very efficiently with circular arcs of the type defined above.

For example, a simple subdivision algorithm may be used. A circular arc is initially constructed, such as for example by defining geodetic coordinates, through approximately the offsets of the start, end and mid points of an input line or arc of an input geometric object about which a buffer is being defined. The distance from the constructed arc to the input (i.e. the input geometric object) is then computed at two intermediate points, and compared to a prescribed distance defined by the buffer. When the deviation of the computed distance from the prescribed distance exceeds the prescribed allowable tolerance, the arc is split at its midpoint, and the process is applied recursively to its two parts. Embodiments may be implemented where for an error tolerance of 0.001d, no arc is subdivided more than twice.

Note that parallels (i.e. lines of constant latitude) are circles as described above. By being equidistant from the poles they are exactly circular on the ellipsoid as well. It follows that buffers about the poles can be represented exactly by arcs of the type defined above. Inasmuch as the distance between every pair of parallels is constant, the offset of parallels can also be represented exactly by the arcs described above.

Figure 2:
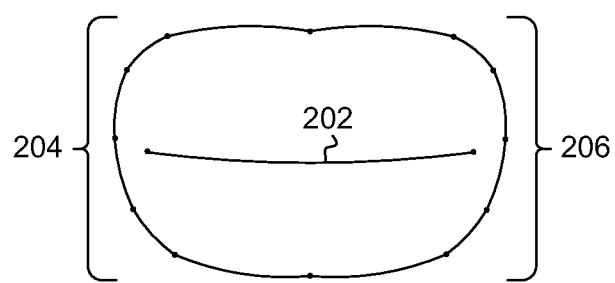
FIG. 2 illustrates a round or elliptical-object model buffer using polygon representations with loose tolerances.
Figure 3:
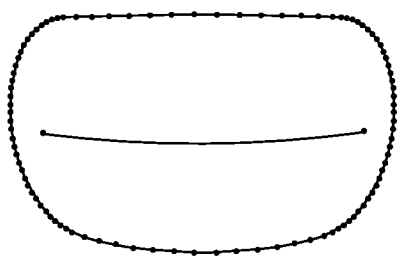
FIG. 3 illustrates a round or elliptical-object model buffer using polygon representations with tighter tolerances than those shown in FIG. 2.

The following illustrates examples. For comparison, a buffer of 3000 km about the line (−40 0, 40 0) on the equator in three separate modes are illustrated. To illustrate the fact that the offset of a line segment is not a line segment, the first one, illustrated in FIG. 2, is a polygonal approximation with a loose error tolerance (in this example, 150 km). The deviation of the polygonal approximations (with two line segments each) from the theoretical offset curves is clearly visible in FIG. 2 which shows polygonal approximation with loose error tolerance. With a tight error tolerance (in this example, 3 km), the polygonal approximation of the two offset curves in the second mode requires 28 linear edges. The approximation of the entire buffer requires 100 edges. The result is illustrated in FIG. 3.

Figure 4:
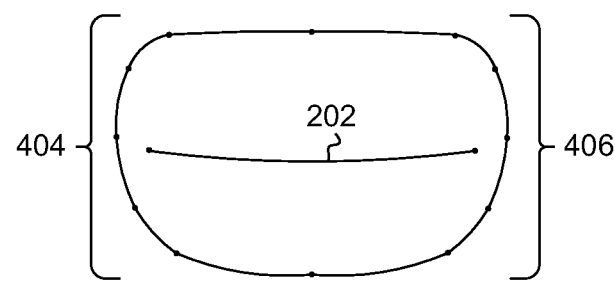
FIG. 4 illustrates a round or elliptical-object model buffer using arc representations with tighter tolerances than those shown in FIG. 2.

With circular arcs, the buffer is approximated with the same tight error tolerance (3 km) by 6 circular arcs, as illustrated in FIG. 4. Inasmuch as the input line 202 lies on the equator, its offsets are segments of parallels, which are exactly arcs defined as described above. The caps 404 and 406 cannot be represented exactly as arcs, and the approximation of each cap therefore uses two arcs.

Figure 5:
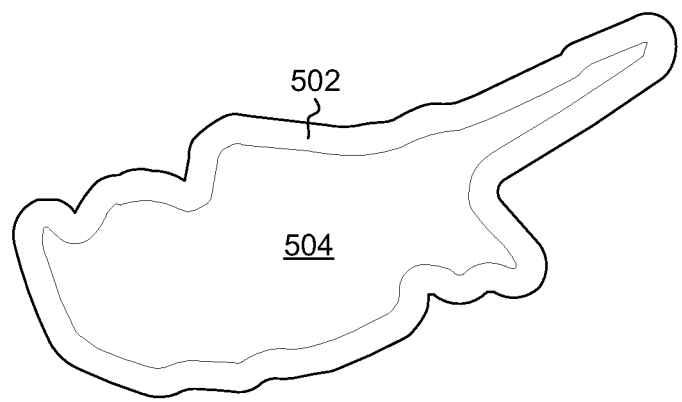
FIG. 5 illustrates a round or elliptical-object model using arc representations for a buffer.

A somewhat less contrived example shown in FIG. 5 is a 10 km buffer 502 about the Mediterranean island of Cyprus 504, which is defined as a polygon with 134 vertices. With an error tolerance of 10 m, a polygonal approximation required 441 vertices. Using arcs, the same accuracy is achieved with 253 vertices.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
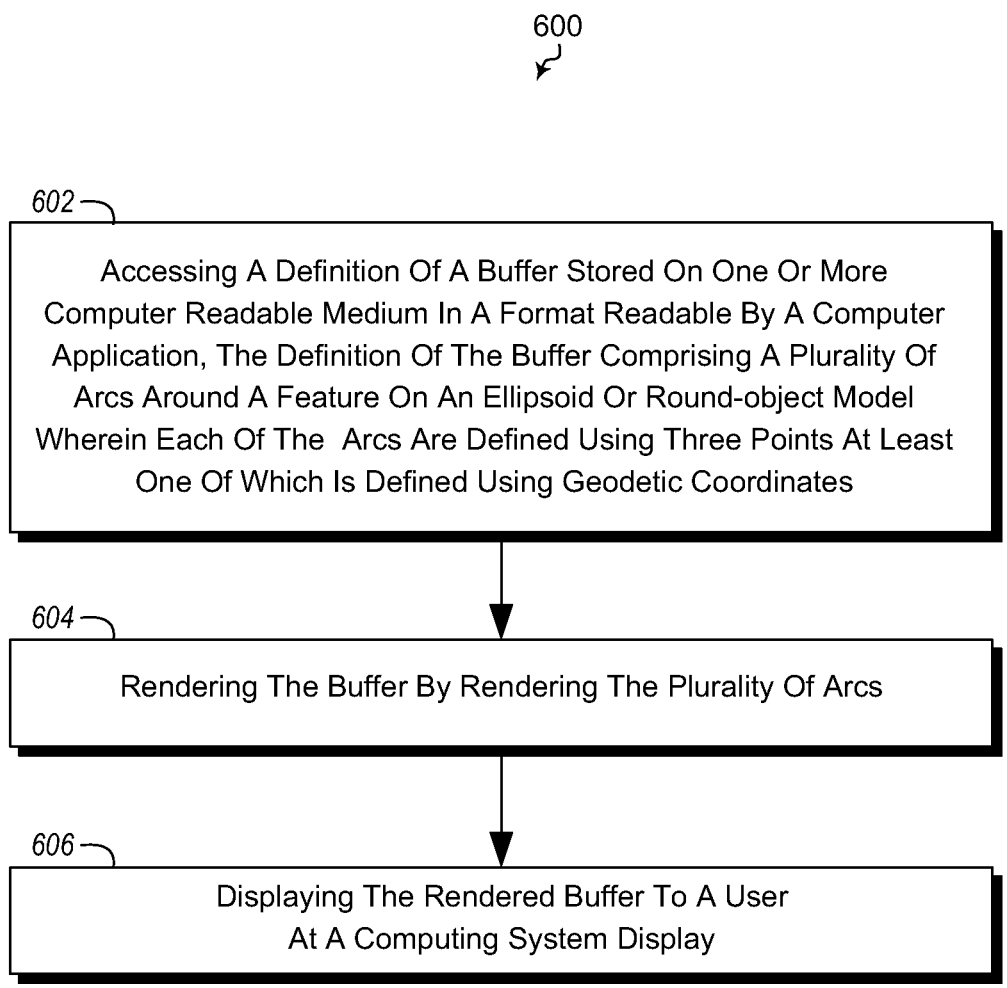
FIG. 6 illustrates a method of representing a buffer about a feature represented on an ellipsoid or round-object model.

Referring now to FIG. 6, a method 600 is illustrated with method acts of representing a buffer about a feature represented on an ellipsoid or round-object model. The method includes accessing a definition of a buffer stored on one or more computer readable medium in a format readable by a computer application (act 602). The definition of the buffer comprises a plurality of arcs around a feature on an ellipsoid or round-object model. Each of the arcs is defined using three data points, at least one of which is defined using geodetic coordinates, such as latitude and longitude. For example, in some embodiments, the three data points comprise two endpoints of a given arc defined using geodetic coordinates and a point on the arc between the two endpoints. The point on the arc between the two endpoints is defined using geodetic coordinates. In an alternative embodiment, the three data points comprise two endpoints of a given arc defined using geodetic coordinates and a bulge number. A bulge number defines the curvature of an arc. For example, the bulge may be zero for a straight line and larger for larger curvatures. The sign of the bulge number indicates to which side of a line defined by the endpoints the arc curves.

The method 600 further includes rendering the buffer by rendering the plurality of arcs (act 604). The method 600 further includes displaying the rendered buffer to a user at a computing system display (act 606). In particular, the buffer along with the feature being buffered may be rendered and displayed on a computer display.

The method 600 may be practiced where the definition of the buffer is stored in a computer database and is accessible by a database system.

The method 600 may be practiced where the arcs are defined using a data type specific to arcs on ellipsoid or round-object models such that point values defined in objects of the data type are by definition geodetic coordinates. For example, one embodiment may be embodied in an SQL Server® using circular arcs in the existing round-earth Sql-Geography type. The circular arcs may be by definition of the containing type, comprised of geodetic coordinates.

The method 600 may be practiced where the ellipsoid or round-object model is an ellipsoid or round-earth model. Thus while embodiments may be useful in virtually any ellipsoid or round-object representations, some embodiments may be directed specifically to ellipsoid or round-earth models.

The method 600 may be practiced where one or more of the arcs are defined by: (a) initially defining a first arc based on start, end and mid points of at least a portion of an input object and a buffer distance; (b) computing the distance from the defined first arc to the input object at two intermediate points as compared to a prescribed distance defined by the buffer; (c) determining that a deviation of the computed distance from the prescribed distance, exceeds the allowable tolerance; and (d) as a result, splitting the first arc at its midpoint in two and creating a second and third arc, wherein the second and third arcs each retain one endpoint of the first arc as an endpoint and define a remaining shared endpoint and an interior point based on points of the input object and the buffer distance. Acts (a)-(d) may be applied recursively to one or more remaining arcs until the act of determining that a deviation of the computed tolerance from the prescribed distance (i.e. act (c)), exceeds the allowable tolerance produces a negative result on all the remaining arcs. In other words, when all arcs are at the prescribed distance within the prescribed tolerance, there may be no additional need to split arcs and form new arcs.

The method 600 may be practiced where the ellipsoid or round-object model is a round-object model, and the arcs are circular arcs. Alternatively, the method 600 may be practiced where the ellipsoid or round-object model is an ellipsoid-object model, and the arcs are not exactly circular, but are nonetheless mapped using definitions of circular arcs on the unit sphere over to the ellipsoid by using mapping that associates every point on the ellipsoid with the unit vector that is normal to the surface of the ellipsoid.

Figure 7:
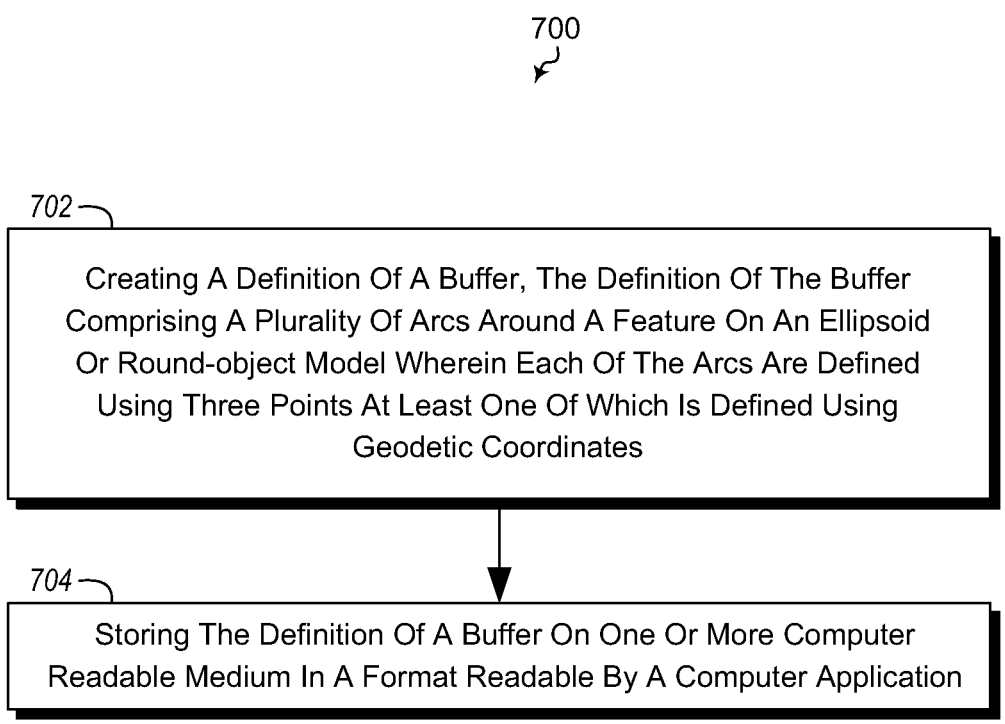
FIG. 7 illustrates another method of representing a buffer about a feature represented on an ellipsoid or round-object model.

Referring now to FIG. 7 another method is illustrated. The method 700 illustrates acts for representing a buffer about a feature represented on an ellipsoid or round-object model. The method includes creating a definition of a buffer (act 702). The definition of the buffer includes a plurality of arcs around a feature on an ellipsoid or round-object model. Each of the arcs is defined using three points defined using geodetic coordinates. The three points comprise two endpoints of a given arc defined using geodetic coordinates and a point on the arc between the two endpoints. The point on the arc between the two endpoints is defined using geodetic coordinates. The method 700 further includes storing the definition of a buffer on one or more computer readable medium in a format readable by a computer application (act 704).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry on desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for generating a computerized image of an ellipsoid earth model having a buffer around the model, the computer-implemented method comprising:

retrieving from a computer store a selected ellipsoid earth model;

one or more processors generating a buffer for the selected ellipsoid earth model by performing the following computer-implemented acts:

(i) defining a buffer distance which represents an error tolerance for establishing a buffer around the selected ellipsoid earth model;

(ii) defining a plurality of arcs which define an initial buffer around the selected ellipsoid earth model, each arc having start, end and mid points, with at least one of the start, end and mid points defined by geodetic coordinates;

(iii) for each said arc, comparing to said defined buffer distance a distance from the arc to the selected ellipsoid earth model at two intermediate points;

(iv) if the compared distance from a particular arc exceeds the error tolerance then splitting the particular arc at its mid-point to create a second and a third arc for the particular arc, the second and third arcs each having as an endpoint one of the start or end points of the particular arc that was split, and if the compared distance from the particular arc does exceed the error tolerance, then moving to another arc for the defined buffer;

(v) repeating the acts for (iii) and (iv) for the second and third arcs, and for each said another arc, until the compared distance from each such arc no longer exceeds the error tolerance; and (vi) generating a final buffer from the arcs produced from the recursive performance of acts (iii) through (v) above; and rendering the selected ellipsoid earth model with the final buffer by displaying the rendered model with its buffer to a user at a computing system display.

2. The method of claim 1, wherein the computer store is a computer database accessible by a database system.

3. The method of claim 1, wherein the arcs are defined using a data type specific to arcs on ellipsoid earth models such that point values defined in objects of the data type are by definition geodetic coordinates.

4. The method of claim 1, wherein the arcs are not exactly circular, but are nonetheless mapped using definitions of circular arcs on a unit sphere over to the ellipsoid earth model.

5. The method of claim 4, wherein the mapping associates every point on the ellipsoid earth model with a unit vector that is normal to the surface of the ellipsoid earth model.

6. A computer program product comprising a computer storage device which contains computer-executable instructions which, when executed by a computing system, implement a computerized method for generating a computerized image of an ellipsoid or round object earth model having a buffer around the model, the computerized method comprising:
   retrieving from a computer store a selected ellipsoid or round object earth model;
   one or more processors generating a buffer for the selected model by performing the following computer-implemented acts:
   (i) defining a buffer distance which represents an error tolerance for establishing a buffer around the selected model;
   (ii) defining a plurality of arcs which define an initial buffer around the selected model, each arc having start, end and mid points, with at least one of the start, end and mid points defined by geodetic coordinates;
   (iii) for each said arc, comparing to said defined buffer distance a distance from the arc to the selected model at two intermediate points;
   (iv) if the compared distance from a particular arc exceeds the error tolerance then splitting the particular arc at its mid-point to create a second and a third arc for the particular arc, the second and third arcs each having as an endpoint one of the start or end points of the particular arc that was split, and if the compared distance from the particular arc does exceed the error tolerance, then moving to another arc for the defined buffer;
   (v) repeating the acts for (iii) and (iv) for the second and third arcs, and for each said another arc, until the compared distance from each such arc no longer exceeds the error tolerance; and
   (vi) generating a final buffer from the arcs produced from the recursive performance of acts (iii) through (v) above; and
   rendering the selected model with the final buffer by displaying the rendered model with its buffer to a user at a computing system display.

7. The computer program product of claim 6, wherein the computer store is a computer database accessible by a database system.

8. The computer program product of claim 6, wherein the arcs are defined using a data type specific to arcs on ellipsoid earth models such that point values defined in objects of the data type are by definition geodetic coordinates.

9. The computer program product of claim 6, wherein the arcs are not exactly circular, but are nonetheless mapped using definitions of circular arcs on a unit sphere over to the ellipsoid earth model by using mapping that associates every point on the ellipsoid earth model with a unit vector that is normal to the surface of the ellipsoid earth model.

10. A computer system for generating a computerized image of an ellipsoid or round-object model of a geometric area having a buffer around the model, comprising:
   a computer store which stores data representing one or more models that represent an ellipsoid or round-object model of a geometric area;
   one or more processors; and
   one or more computer storage devices which contain computer-executable instructions which, when executed by the one or more processors, implement a computerized method for generating a computerized image of a selected model having a buffer around the model, the computerized method comprising:
      retrieving from the computer store a selected model for an ellipsoid or round-object geometric area;
      the one or more processors generating a buffer for at least a part of the model by performing the following computer-implemented acts:
      (i) defining a buffer distance which represents an error tolerance for establishing a buffer around the selected part of the model;
      (ii) defining a plurality of arcs which define an initial buffer around the selected part of the model, each arc having start, end and mid points, with at least one of the start, end and mid points defined by geodetic coordinates;
      (iii) for each said arc, comparing to said defined buffer distance a distance from the arc to the selected part of the model at two intermediate points;
      (iv) if the compared distance from a particular arc exceeds the error tolerance then splitting the particular arc at its mid-point to create a second and a third arc for the particular arc, the second and third arcs each having as an endpoint one of the start or end points of the particular arc that was split, and if the compared distance from the particular arc does exceed the error tolerance, then moving to another arc for the defined buffer;
      (v) repeating the acts for (iii) and (iv) for the second and third arcs, and for each said another arc, until the compared distance from each such arc no longer exceeds the error tolerance; and
      (vi) generating a final buffer from the arcs produced from the recursive performance of acts (iii) through (v) above; and
      rendering the selected part of the model with the final buffer by displaying the rendered model with its buffer to a user at a computing system display.

11. The computer system of claim 10, wherein the computer store is a computer database accessible by a database system.

12. The computer system of claim 10, wherein the arcs are defined using a data type specific to arcs on ellipsoid or round-object geometric areas such that point values defined in objects of the data type are by definition geodetic coordinates.

13. The computer system of claim 10, wherein the stored models are ellipsoid or round-earth models.

14. The computer system of claim 13, wherein the selected model is a round-object earth model, and the arcs are circular arcs.

15. The computer system of claim 13, wherein the selected model is an ellipsoid-earth model, and the arcs are not exactly circular, but are nonetheless mapped using definitions of circular arcs on a unit sphere over to the ellipsoid earth model.

16. The computer system of claim 15, wherein the mapping associates every point on the ellipsoid with a unit vector that is normal to the surface of the ellipsoid.

* * * * *